US012100880B2

(12) United States Patent
Okawa

(10) Patent No.: US 12,100,880 B2
(45) Date of Patent: Sep. 24, 2024

(54) HIGH-FREQUENCY MODULE INCLUDING A LAMINATED FILTER HAVING ALTERNATING CONDUCTIVE AND DIELECTRIC LAYERS AND A THROUGH HOLE EXTENDING THROUGH THE FILTER FOR COUPLING TO A TRANSMISSION LINE

(71) Applicant: NEC Corporation, Tokyo (JP)

(72) Inventor: Takashi Okawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 419 days.

(21) Appl. No.: 17/428,130

(22) PCT Filed: Jan. 9, 2020

(86) PCT No.: PCT/JP2020/000512
§ 371 (c)(1),
(2) Date: Aug. 3, 2021

(87) PCT Pub. No.: WO2020/166238
PCT Pub. Date: Aug. 20, 2020

(65) Prior Publication Data
US 2022/0131252 A1 Apr. 28, 2022

(30) Foreign Application Priority Data
Feb. 13, 2019 (JP) ................................ 2019-023468

(51) Int. Cl.
*H01P 5/107* (2006.01)
*H01P 1/203* (2006.01)
*H01P 11/00* (2006.01)

(52) U.S. Cl.
CPC .......... *H01P 5/107* (2013.01); *H01P 1/20345* (2013.01); *H01P 11/007* (2013.01)

(58) Field of Classification Search
CPC ...................................................... H01P 5/107
(Continued)

(56) References Cited

U.S. PATENT DOCUMENTS 3,845,422 A 10/1974 Rhodes
5,982,250 A 11/1999 Hung et al.
(Continued)

FOREIGN PATENT DOCUMENTS

JP S5652901 A 5/1981
JP H11243307 A 9/1999
(Continued)

OTHER PUBLICATIONS

International Search Report for PCT Application No. PCT/JP2020/000512, mailed on Feb. 10, 2020.
(Continued)

*Primary Examiner* — Benny T Lee

(57) ABSTRACT

A high-frequency module including a transmission line for a high-frequency signal and a waveguide conversion structure, capable of reducing the size thereof, and a method for manufacturing such a high-frequency module are provided. A high-frequency module includes a core material in which a first dielectric layer is provided between a first conductive layer and a second conductive layer, a laminated filter in which a plurality of core materials and dielectric layers are alternately laminated, and a through hole pierces therethrough from a lowermost conductive layer provided so as to be in contact with the lowermost dielectric layer to the uppermost first conductive layer, a first surface dielectric layer provided above the laminated filter, and a first surface conductive layer provided above the first surface dielectric layer, the first surface conductive layer including a transmission line for a high-frequency signal and a ground GND.

8 Claims, 11 Drawing Sheets

10

(58) Field of Classification Search
USPC .............................................................. 333/26
See application file for complete search history.

(56) References Cited

U.S. PATENT DOCUMENTS

| | | | | |
|---|---|---|---|---|
| 2003/0197573 | A1* | 10/2003 | Kato | H01P 5/107 333/33 |
| 2007/0120618 | A1* | 5/2007 | Peulevey et al. | H05K 1/0237 333/26 |

FOREIGN PATENT DOCUMENTS

| | | | |
|---|---|---|---|
| JP | H11308025 | A | 11/1999 |
| JP | 2013247495 | A | 12/2013 |
| JP | 2015146544 | A | 8/2015 |
| JP | 2015149711 | A | 8/2015 |

OTHER PUBLICATIONS

JP Office Action for JP Application No. 2020-572121, mailed on May 17, 2022 with English Translation.
"Current Electric Engineering Course High Frequency Circuit", Ohm Corp., published on Feb. 25, 1963, pp. 206-210.

* cited by examiner

HIGH-FREQUENCY MODULE INCLUDING A LAMINATED FILTER HAVING ALTERNATING CONDUCTIVE AND DIELECTRIC LAYERS AND A THROUGH HOLE EXTENDING THROUGH THE FILTER FOR COUPLING TO A TRANSMISSION LINE

This application is a National Stage Entry of PCT/JP2020/000512 filed on Jan. 9, 2020, which claims priority from Japanese Patent Application 2019-023468 filed on Feb. 13, 2019, the contents of all of which are incorporated herein by reference, in their entirety.

TECHNICAL FIELD

The present disclosure relates to a high-frequency module and a method for manufacturing such a high-frequency module. In particular, the present disclosure relates to a high-frequency module including a transmission line for a high-frequency signal and a waveguide conversion structure, capable of reducing the size thereof, and a method for manufacturing such a high-frequency module.

BACKGROUND ART

In recent years, there has been a demand for increasing the capacity of communication, and progress in the development of a high-frequency module capable of handling, as frequency bands by which the capacity of communication can be increased, high frequency bands such as millimeter waves and terahertz waves is now being made. As one of such high-frequency modules, a module that converts a signal that has been transmitted through a waveguide into a signal propagating through a microstrip line has been known. It has been desired to reduce the size of such a high-frequency module by reducing the number of components used therein and the circuit area thereof.

Patent Literature 1 provides a planar transmission-line waveguide converter including: a rectangular waveguide, and a dielectric substrate, in which the dielectric substrate includes a planar transmission line formed on the dielectric substrate and configured to propagate a high-frequency signal, and a probe configured to couple the planar transmission line with the rectangular waveguide; the dielectric substrate is inserted into the rectangular waveguide in a direction parallel to an E-plane of the rectangular waveguide perpendicular to an H-plane thereof in order to make the probe couple with an electric field inside the rectangular waveguide; and the probe is positioned closer to the dielectric substrate than to the center of the H plane of the rectangular waveguide, and adjusts the place inside the waveguide at which the electric field concentrates is adjusted, so that a signal propagating through the planar line is output to the waveguide with a low loss without being affected by the thickness of the dielectric layer of the dielectric substrate. The planar transmission-line waveguide converter disclosed in Patent Literature 1 requires the use of an external filter, so that it is difficult to reduce the size thereof.

CITATION LIST

Patent Literature

Patent Literature 1: Japanese Unexamined Patent Application Publication No. 2015-149711, Publication date: Aug. 30, 2015

SUMMARY OF THE INVENTION

Technical Problem

A high-frequency module for converting a signal propagating through a waveguide into a signal propagating through a microstrip line includes a conversion circuit (a conversion structure) that converts a signal in a plane circuit into a signal propagating through the waveguide, and a filter that removes an unnecessary signal. When a filter is designed by a planar circuit, the filter is designed by using a dielectric substrate, so that a passage loss caused by a dielectric loss increases. Therefore, an amplifier for compensating for the passage loss is required. Such an amplifier has a number of amplification stages and requires a large area, and therefore prevents the size of the high-frequency module from being reduced. Further, when an external waveguide filter is used as a filter of a high-frequency module, it is difficult to reduce the size of the high-frequency module because the external waveguide filter is large and expensive. As described above, there has been a problem that it is difficult to reduce the size of a high-frequency module.

An object of the present disclosure is to provide a high-frequency module and a method for manufacturing a high-frequency module, capable of solving the above-described problem.

Solution to the Problem

A high-frequency module according to the present disclosure includes:

- a core material in which a first dielectric layer is provided between a first conductive layer and a second conductive layer;
- a laminated filter in which a plurality of core materials and dielectric layers are alternately laminated, and a through hole pierces therethrough from a lowermost conductive layer provided so as to be in contact with the lowermost dielectric layer to the uppermost first conductive layer;
- a first surface dielectric layer provided above the laminated filter; and
- a first surface conductive layer provided above the first surface dielectric layer, the first surface conductive layer including a transmission line for a high-frequency signal and a ground, in which
- a first width of the through hole in the first dielectric layer is different from a second width of the through hole in the dielectric layer.

A high-frequency module according to the present disclosure includes:

- a core material in which a first dielectric layer is provided between a first conductive layer and a second conductive layer;
- a laminated filter in which: a plurality of core materials and dielectric layers are alternately laminated; a first through hole pierces therethrough from a lowermost conductive layer provided so as to be in contact with the lowermost dielectric layer to the uppermost first conductive layer; and a second through hole pierces therethrough from the lowermost conductive layer to the uppermost first conductive layer;
- a first surface dielectric layer provided above the laminated filter;

a first surface conductive layer provided above the first surface dielectric layer, the first surface conductive layer including a transmission line for a high-frequency signal and a ground; and a through via configured to electrically connect the ground to the uppermost first conductive layer, in which in the laminated filter: a part of the first dielectric layer or the dielectric layer is removed, and the first and second through holes are connected to each other by a first opening; and another part of the first dielectric layer or the dielectric layer is removed, and the first and second through holes are connected to each other by a second opening.

A method for manufacturing a high-frequency module according to the present disclosure includes:

a step of forming, in a core material in which a first dielectric layer is provided between a first conductive layer and a second conductive layer, a through hole piercing therethrough from the first conductive layer to the second conductive layer;

a step of forming a laminated core material by increasing a width of the through hole in the first conductive layer to a second width and increasing the width of the through hole in the second conductive layer to the second width; a step of forming a dielectric layer by forming a through hole having the second width in a dielectric;

a step of forming a laminated filter by alternately laminating the dielectric layer and the laminated core material above a lowermost conductive layer;

a step of forming a through hole having the second width in the lowermost conductive layer;

a step of forming a plating layer of a conductive material on a surface of the laminated filter on a side thereof bordering the through hole piercing therethrough;

a step of forming a first surface dielectric layer above the laminated filter;

a step of forming a first surface conductive layer above the first surface dielectric layer, the first surface conductive layer including a transmission line for a high-frequency signal and a ground;

a step of forming a first through via configured to electrically connect the ground to the uppermost first conductive layer; and a step of forming a second through via configured to electrically connect the ground, the first conductive layer, the second conductive layer, and the lowermost conductive layer to each other.

Advantageous Effects of the Invention

According to the present disclosure, it is possible to provide a high-frequency module including a transmission line for a high-frequency signal and a waveguide conversion structure, capable of reducing the size thereof, and a method for manufacturing such a high-frequency module.

DETAIL DESCRIPTION OF THE EMBODIMENTS

Figure 1:
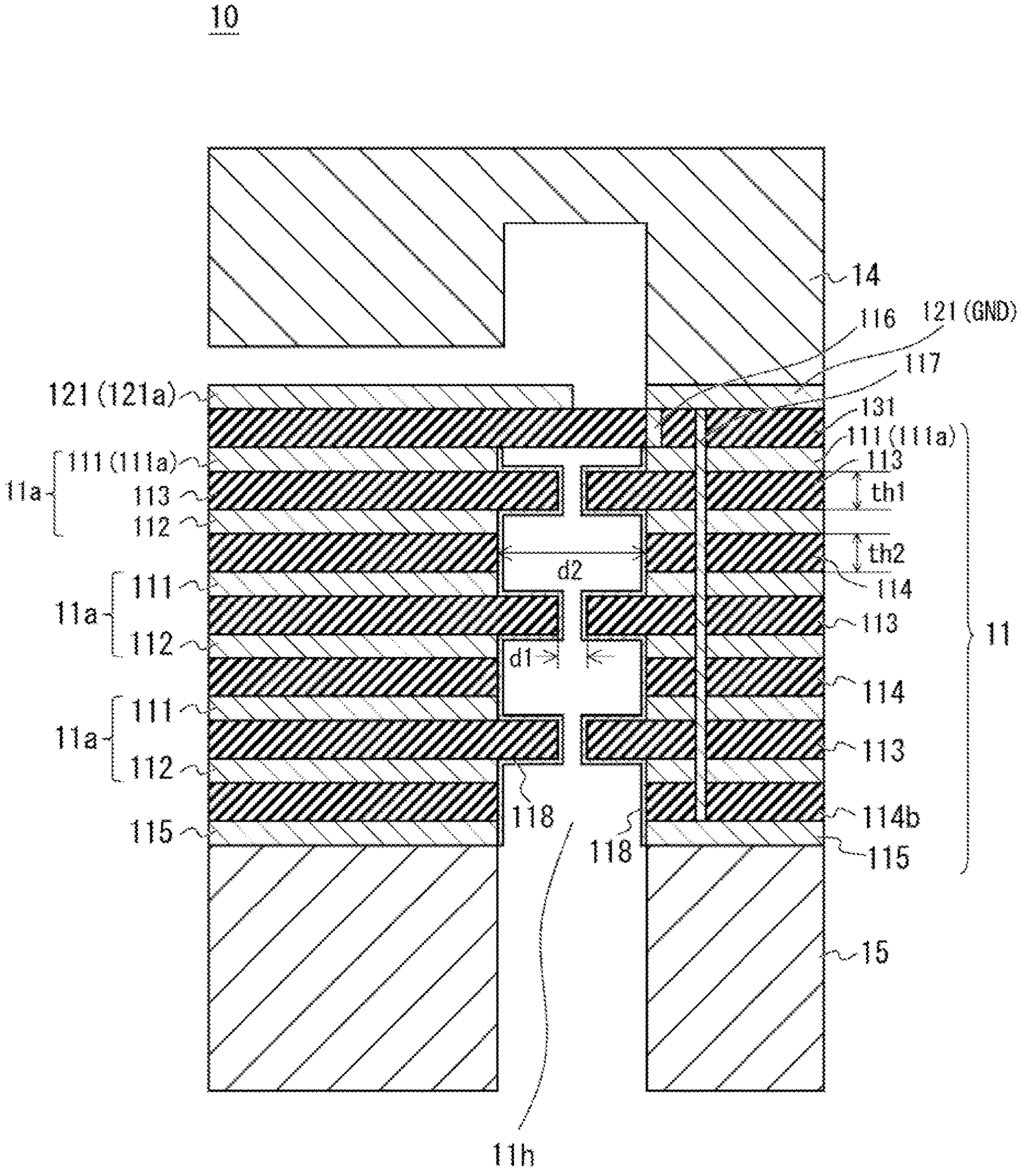
FIG. 1 is a cross-sectional view showing an example of a high-frequency module according to a first example embodiment.

Example embodiments according to the present invention will be described hereinafter with reference to the drawings. The same or corresponding elements are denoted by the same reference numerals (or symbols) throughout the detail description of the drawings, and redundant explanations are omitted as appropriate for clarifying the explanation

First Example Embodiment

Firstly, a structure of a high-frequency module according to a first example embodiment will be described.

In the first example embodiment, a microstrip-line to waveguide conversion structure using eight layers (a substrate) will be described as an example. However, the high-frequency module according to the first example embodiment may have any number of layers besides eight layers. Further, the microstrip line is merely an example. That is, the present disclosure can be applied to other types of transmission lines for high-frequency signals (such as a transmission line having a co-planar structure or a suspended structure).

FIG. 1 is a cross-sectional view showing an example of a high-frequency module according to the first example embodiment.

Figure 2:
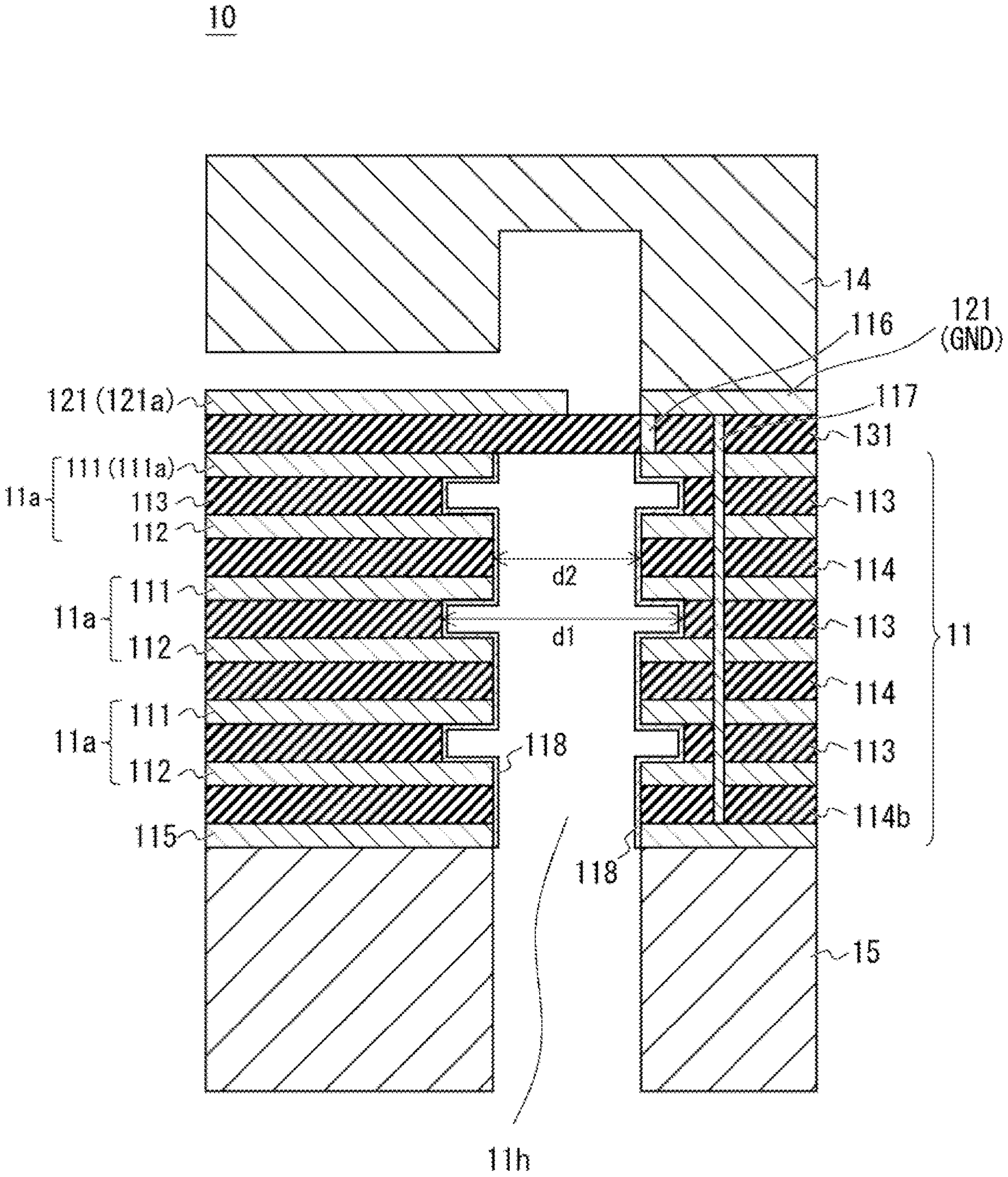
FIG. 2 is a cross-sectional view showing an example of a high-frequency module according to the first example embodiment.

FIG. 2 is a cross-sectional view showing an example of a high-frequency module according to the first example embodiment.

As shown in FIGS. 1 and 2, a high-frequency module 10 according to the first example embodiment includes a laminated filter 11, a first surface dielectric layer 131, and a first surface conductive layer 121.

In the laminated filter 11, a plurality of core materials 11*a* and dielectric layers 114 are alternately laminated, and a lowermost conductive layer 115 is provided so as to be in contact with a lowermost dielectric layer 114*b*. In the laminated filter 11, a through hole 11*h* pierces therethrough from the lowermost conductive layer 115 to the uppermost first conductive layer 111*a*. The dielectric layers 114 are made of a dielectric. The lowermost conductive layer 115 is an inner-layer pattern formed of a conductor.

Each of the core materials 11*a* includes a first conductive layer 111, a second conductive layer 112, and a first dielectric layer 113, and the first dielectric layer 113 is disposed between the first and second conductive layers 111 and 112. The first and second conductive layers 111 and 112 are inner-layer patterns formed of a conductor. The first dielectric layer 113 is made of a dielectric.

The first surface dielectric layer 131 is provided above the laminated filter 11. The first surface dielectric layer 131 is made of a dielectric.

The first surface conductive layer 121 is provided above the first surface dielectric layer 131, and includes a microstrip line 121*a* and a ground GND. The first surface conductive layer 121 is a surface-layer pattern formed of a conductor.

A first width d1 of the through hole 11*h* in the first dielectric layer 113 is different from a second width d2 of the through hole 11*h* in the dielectric layer 114. That is, the first width d1 and the second width d2 are not equal to each other.

For example, as shown in FIG. 1, the first width d1 of the through hole 11*h* in the first dielectric layer 113 is smaller than the second width d2 of the through hole 11*h* in the dielectric layer 114. Further, for example, as shown in FIG. 2, the first dielectric layer 113 is recessed relative to the dielectric layer 114. That is, the first width d1 of the through hole 11*h* in the first dielectric layer 113 is larger than the second width d2 of the through hole 11*h* in the dielectric layer 114.

The second width d2 of the through hole 11*h* in the dielectric layer 114 corresponds to the size of a waveguide through which an electromagnetic wave having a predetermined frequency passes. Therefore, the second width d2 can be determined based on the predetermined frequency. When the first width d1 is smaller than the second width d2 (see FIG. 1), the laminated filter 11 becomes a circuit having an inductive reactance component and functions as a low-pass filter (LPF: Low Pass Filter). On the other hand, when the first width d1 is larger than the second width d2 (see FIG. 2), the laminated filter 11 becomes a circuit having a capacitive reactance component and functions as a high-pass filter (HPF: High Pass Filter). The amounts of the attenuations of the low-pass filter and the high-pass filter (Laminated Filter 11) are determined by the thickness th1 of the first dielectric layer 113 and the first width d1 of the through hole 11*h* in the first dielectric layer 113. Therefore, the first width d1 can be determined based on the thickness th1 and the amount of the attenuation of the laminated filter 11.

The thickness th1 (FIG. 1) of the first dielectric layer 113 is an integer multiple of a quarter (¼) of a wavelength corresponding to the predetermined frequency. The thickness th2 (FIG. 1) of the dielectric layer 114 is an integer multiple of a quarter (¼) of the wavelength corresponding to the predetermined frequency.

The high-frequency module 10 further includes a first through via 116 and a second through via 117. The first through via 116 electrically connects the ground GND to the uppermost first conductive layer 111*a*. The second through via 117 electrically connects the ground GND, the first conductive layer 111, the second conductive layer 112, and the lowermost conductive layer 115 to each other.

The high-frequency module 10 further includes a short-circuited lid 14 and a metal body 15. The short-circuited lid 14 is provided so as to be in contact with the ground GND. The short-circuited lid 14 is made of metal, and forms a short-circuited surface for the conversion of transmission modes between the microstrip line 121*a* of the first surface conductive layer 121 and the waveguide.

The metal body 15 is provided so as to be in contact with the lowermost conductive layer 115, and the through hole 11*h* pierces therethrough. The metal body 15 is a metal piece including an interface for the waveguide. A space inside the through hole 11*h* of the metal body 15 is referred to as a waveguide interface.

The high-frequency module 10 may further include a plating layer 118 disposed on a surface of the laminated filter 11 on the side thereof bordering the through hole 11*h*. The plating layer 118 contains a conductive material. The plating layer 118 is contact with the core materials 11*a*, the dielectric layers 114, and the lowermost conductive layers 115.

The thickness of the plating layer 118 is adjusted so that, when an electromagnetic wave having a predetermined frequency is transmitted through the through hole 11*h* (through the waveguide interface), the transmission loss thereof is lowered to or below a predetermined loss. For example, the transmission loss is lowered and the transmission becomes effective by adjusting the thickness of the plating layer 118 to a thickness equal to or larger than the skin depth of an electromagnetic wave having the predetermined frequency.

Note that the first conductive layers 111, the second conductive layers 112, and the lowermost conductive layer 115 are collectively referred to as conductive layers. Further, the dielectric layers 114 and the first dielectric layers 113 are collectively referred to as dielectric layers.

Further, it may be expressed that the high-frequency module 10 includes: a microstrip part including a microstrip line 121*a* and a ground GND; a filter part including a laminated filter 11; and a waveguide interface including a metal body 15.

The high-frequency module 10 transmits an electromagnetic wave input from the waveguide interface to the microstrip part through the filter part. The high-frequency module 10 includes a microstrip-line to waveguide conversion structure for converting a signal that has been transmitted through the waveguide into a signal propagating through the microstrip line. The high-frequency module 10 includes, in the microstrip-line to waveguide conversion structure using the multilayer substrate, the filter (the laminated filter 11) using a stub or the like having a periodic structure formed by a dielectric and an inner-layer pattern. Note that the dielectric corresponds to the first surface dielectric layer 131, the first dielectric layers 113, and the dielectric layers 114, and the inner-layer pattern corresponds to the first conductive layers 111, the second conductive layers 112, and the lowermost conductive layer 115. In this way, there is no need to provide an external filter or the like, so that the size of the high-frequency module can be reduced and the number of components can also be reduced. Consequently, it is possible to reduce the cost.

Next, a method for manufacturing a high-frequency module according to the first example embodiment will be described.

A manufacturing process for a multilayer substrate for a high-frequency module includes a process for manufacturing a core material in which copper foils are bonded to a dielectric, and a process for forming a multilayer structure by alternately laminating core materials and prepregs. The prepreg is an adhesive for bonding core materials to each other. The core materials are bonded by the prepreg.

Figure 3A:
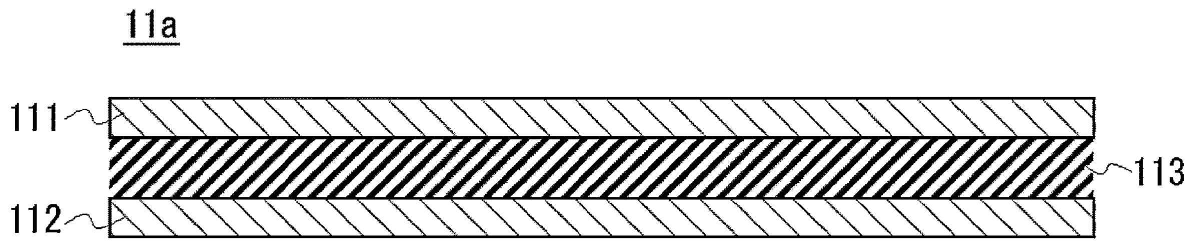
FIG. 3A is a cross-sectional view showing an example of a method for manufacturing a high-frequency module according to the first example embodiment.

FIG. 3A is a cross-sectional view showing an example of a method for manufacturing a high-frequency module according to the first example embodiment.

Figure 3B:
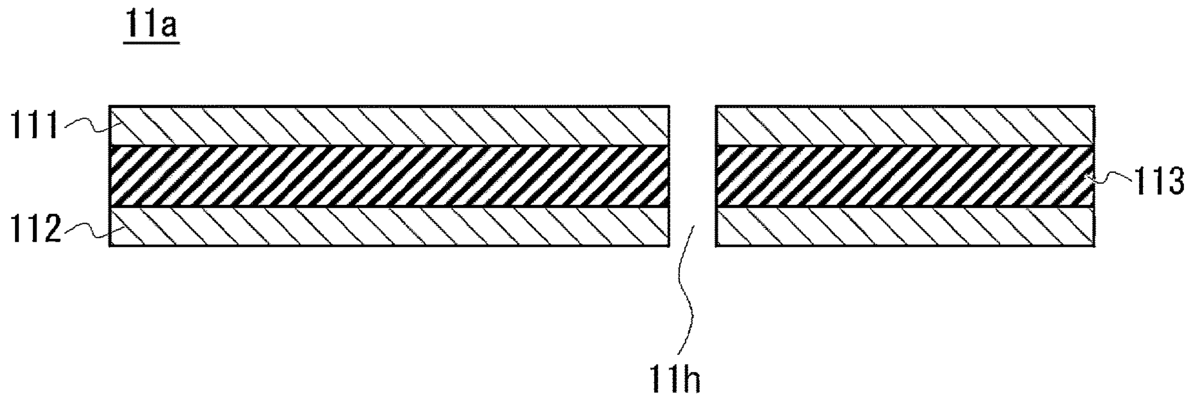
FIG. 3B is a cross-sectional view showing the example of the method for manufacturing the high-frequency module according to the first example embodiment.

FIG. 3B is a cross-sectional view showing the example of the method for manufacturing the high-frequency module according to the first example embodiment.

Figure 3C:
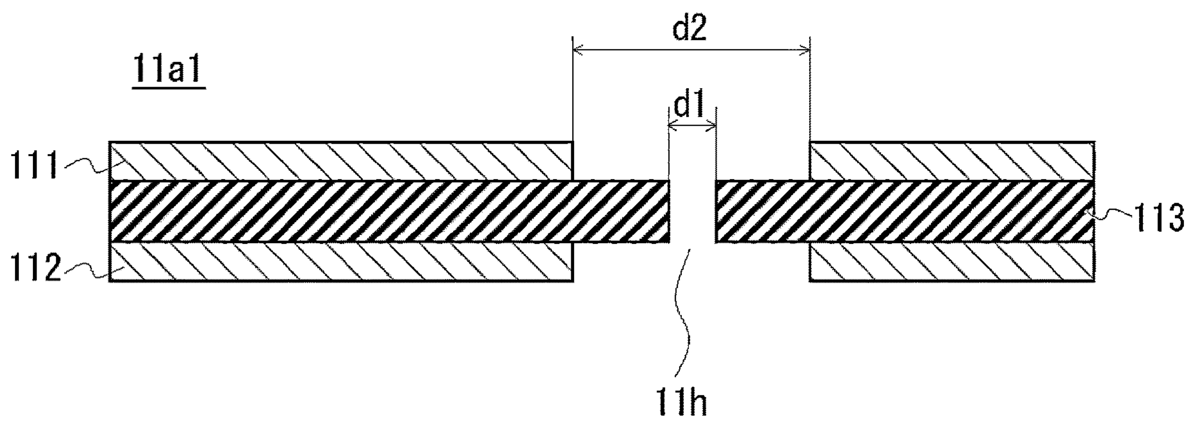
FIG. 3C is a cross-sectional view showing the example of the method for manufacturing the high-frequency module according to the first example embodiment.

FIG. 3C is a cross-sectional view showing the example of the method for manufacturing the high-frequency module according to the first example embodiment.

Figure 4A:
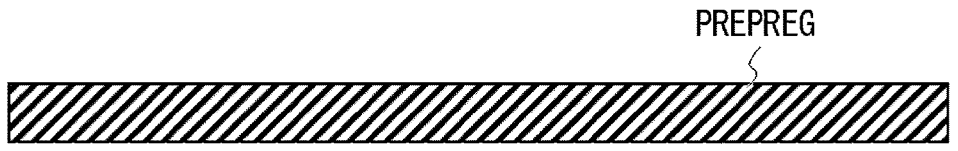
FIG. 4A is a cross-sectional view showing the example of the method for manufacturing the high-frequency module according to the first example embodiment.

FIG. 4A is a cross-sectional view showing the example of the method for manufacturing the high-frequency module according to the first example embodiment.

Figure 4B:
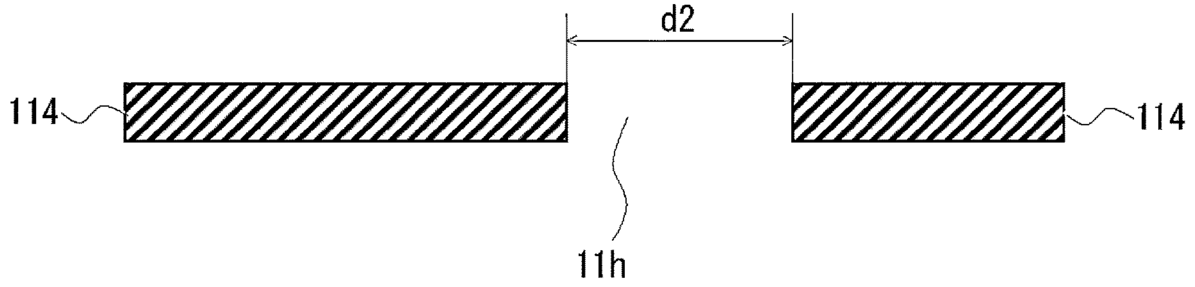
FIG. 4B is a cross-sectional view showing the example of the method for manufacturing the high-frequency module according to the first example embodiment.

FIG. 4B is a cross-sectional view showing the example of the method for manufacturing the high-frequency module according to the first example embodiment.

Figure 5:
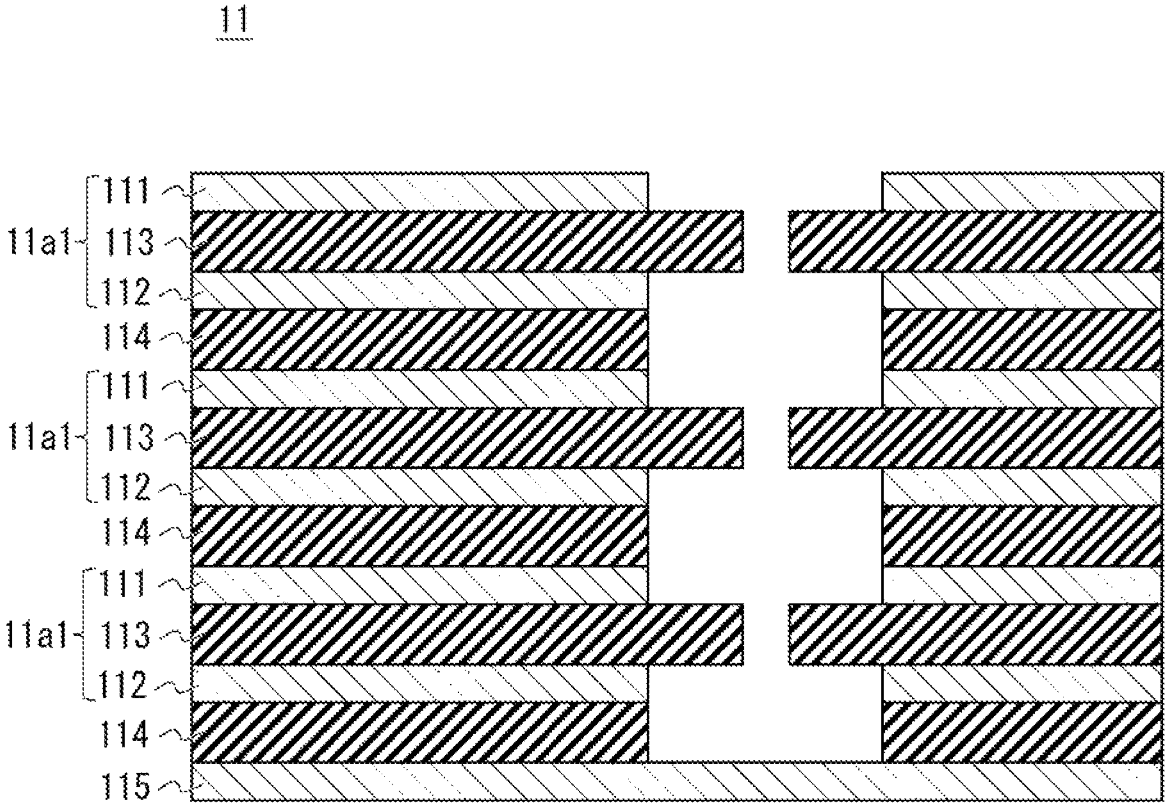
FIG. 5 is a cross-sectional view showing the example of the method for manufacturing the high-frequency module according to the first example embodiment.

FIG. 5 is a cross-sectional view showing the example of the method for manufacturing the high-frequency module according to the first example embodiment.

Figure 6:
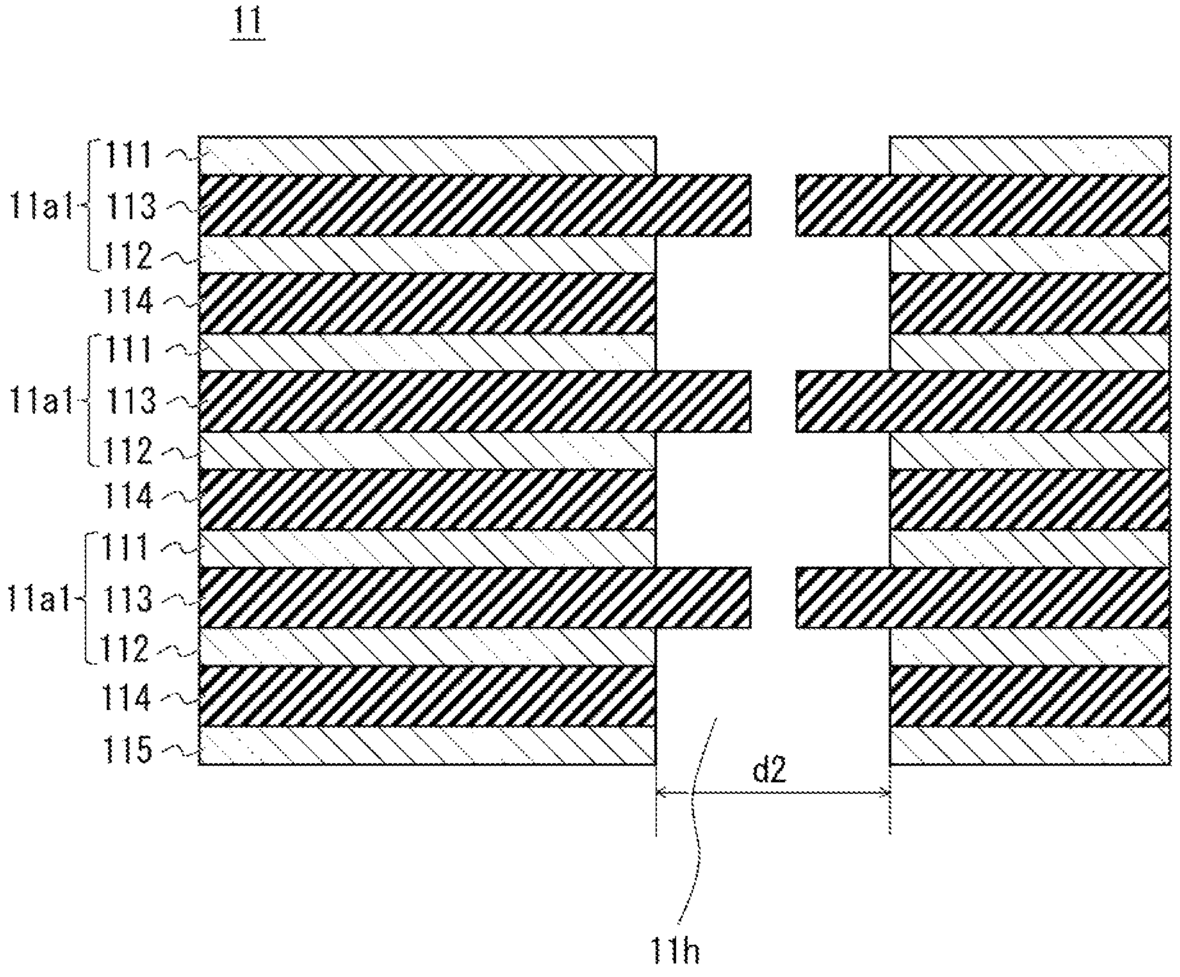
FIG. 6 is a cross-sectional view showing the example of the method for manufacturing the high-frequency module according to the first example embodiment.

FIG. 6 is a cross-sectional view showing the example of the method for manufacturing the high-frequency module according to the first example embodiment.

Figure 7:
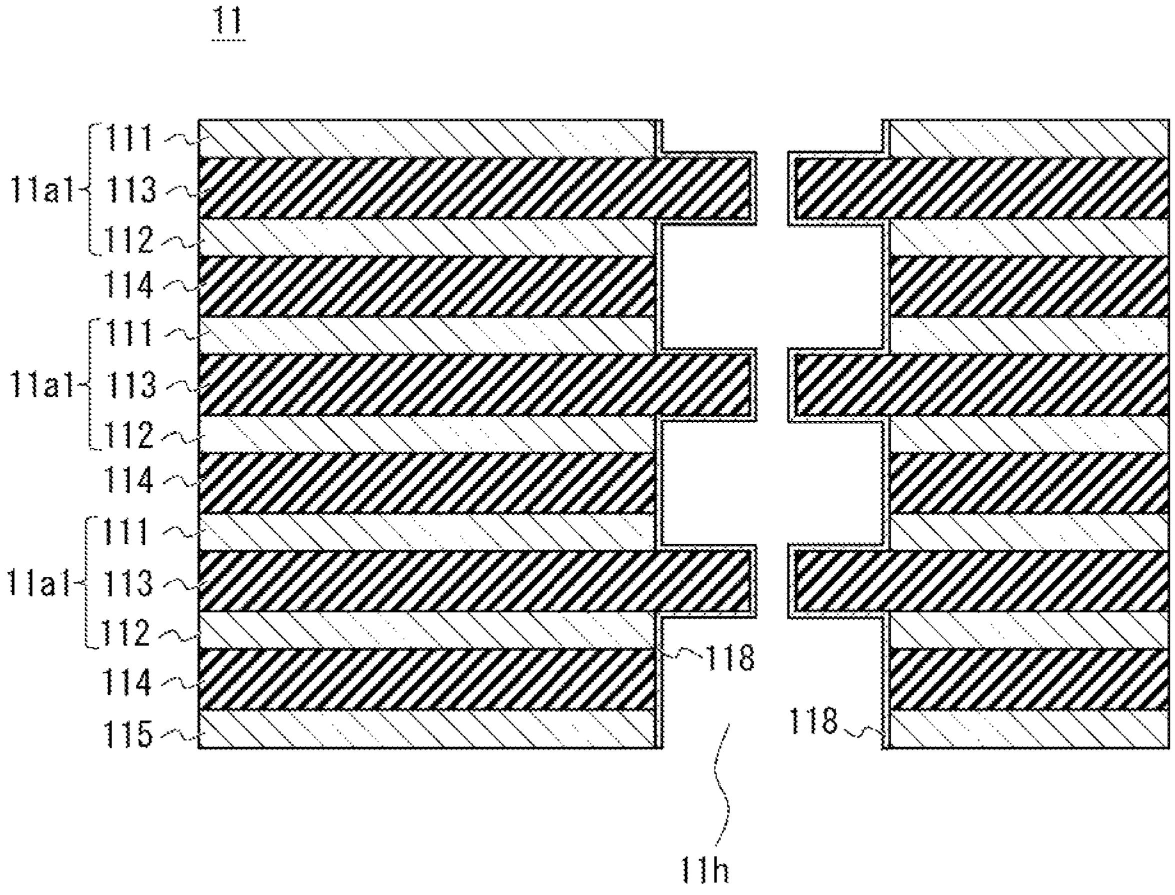
FIG. 7 is a cross-sectional view showing the example of the method for manufacturing the high-frequency module according to the first example embodiment.

FIG. 7 is a cross-sectional view showing the example of the method for manufacturing the high-frequency module according to the first example embodiment.

Figure 8:
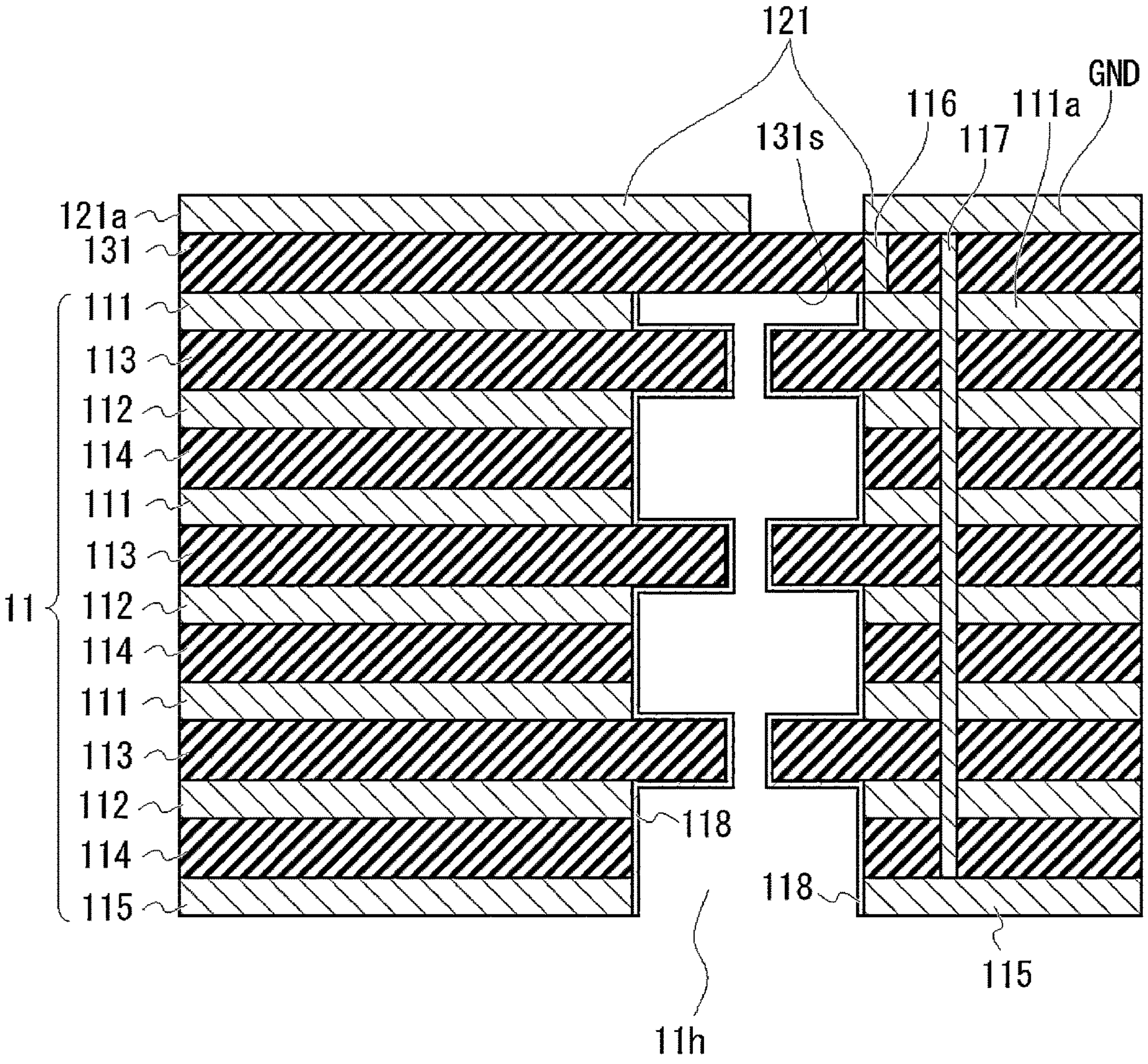
FIG. 8 is a cross-sectional view showing the example of the method for manufacturing the high-frequency module according to the first example embodiment.

FIG. 8 is a cross-sectional view showing the example of the method for manufacturing the high-frequency module according to the first example embodiment.

Figure 9:
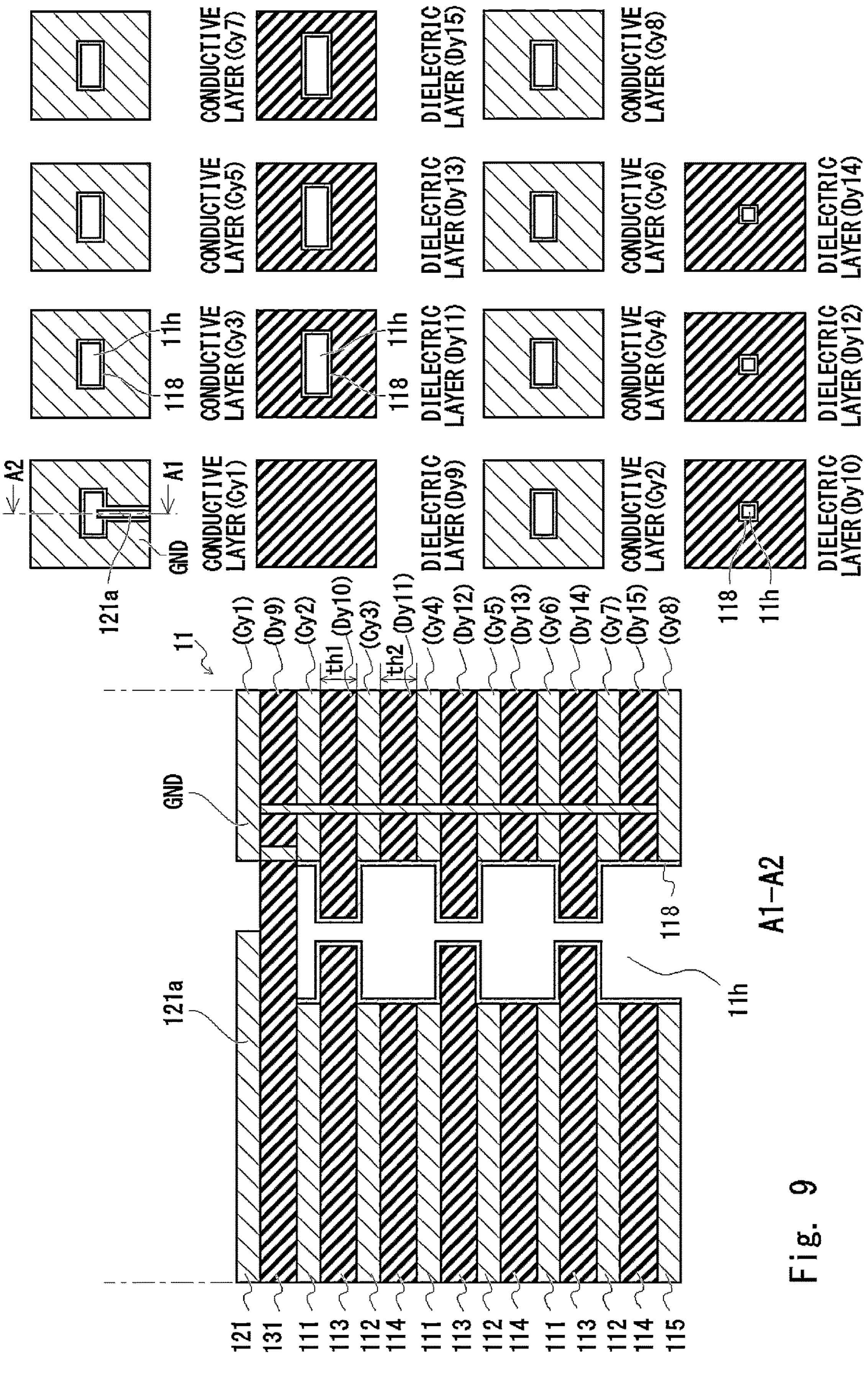
FIG. 9 is a cross-sectional view showing an example of a high-frequency module according to the first example embodiment, and a diagram showing patterns.

FIG. 9 is a cross-sectional view showing an example of a high-frequency module according to the first example embodiment, and a diagram showing patterns. The left diagram in FIG. 9 is a cross-sectional view taken along line A1-A2 in the diagram showing the CONDUCTIVE LAYER (1).

As shown in FIG. 3A, a core material 11*a* in which a first dielectric layer 113 is provided between a first conductive layer 111 and a second conductive layer 112 is prepared. The core material 11*a* is, for example, a material in which copper foils are bonded to a dielectric. In this example, the first and second conductive layers 111 and 112 are copper foils, and the first dielectric layer 113 is made of a dielectric. The core material 11*a* may also be referred to as a "substrate material".

As shown in FIG. 3B, in the core material 11*a*, a hole (a through hole 11*h*) piercing therethrough from the first conductive layer 111 to the second conductive layer 112 is formed by using a rooter or the like.

A laminated core material 11*a*1 shown in FIG. 3C is formed by performing etching or the like on the core material 11*a* shown in FIG. 3B and thereby cutting out (or shaving out) parts of the first and second conductive layers 111 and 112 (the copper foils). That is, the laminated core material 11*a*1 is formed by increasing (i.e., extending) the width of the through hole 11*h* in the first conductive layer 111 from a first width d1 to a second width d2, and increasing (i.e., extending) the width of the through hole 11*h* in the second conductive layer 112 from the first width d1 to the second width d2.

As shown in FIG. 4A, a prepreg is prepared. The prepreg is made of a dielectric and is an adhesive sheet for bonding laminated core materials 11*a*1 (FIG. 3C) to each other.

As shown in FIG. 4B, a dielectric layer 114 is formed by forming a through hole 11*h* having the second width d2 in the prepreg (the dielectric). By forming the through hole 11*h*, when a filter is formed by alternately laminating laminated core materials 11*a*1 (Refer to FIG. 3C) and dielectric layers 114 (Refer to FIG. 4B), a space is formed inside the filter.

As shown in FIG. 5, a laminated filter 11 is formed by alternately laminating dielectric layers 114 and laminated core materials 11*a*1 above the lowermost conductive layer 115 (the copper foil). A space is formed inside the laminated filter 11.

As shown in FIG. 6, a through hole 11*h* having the second width d2 is formed in the lowermost conductive layer 115 by performing etching thereon. In this way, a waveguide is formed.

As shown in FIG. 7, a plating layer 118 is formed, by using a conductive material, on a surface of the laminated filter 11 on the side thereof bordering the through hole 11*h* (i.e., on the waveguide). The conductive material is, for example, gold flash plating or electroless silver plating. The thickness of the plating layer 118 may be such a thickness that when an electromagnetic wave having a predetermined frequency is transmitted through the through hole 11*h* (the waveguide), the transmission loss thereof is equal to or smaller than a predetermined loss. For example, the transmission loss is lowered and the transmission becomes effective by adjusting the thickness of the plating layer 118 to such a thickness that the skin effect of the waveguide does not reach therethrough.

As shown in FIG. 8, a first surface dielectric layer 131 is formed by laminating a dielectric (an adhesive) above the laminated filter 11. A first surface conductive layer 121 having a microstrip line 121*a* and a ground GND is formed by laminating a conductor (a copper foil) above the first surface dielectric layer 131 and performing etching thereon.

A first through via 116 by which the ground GND and the uppermost first conductive layer 111*a* are electrically connected to each other is formed. A second through via 117 by which the ground GND, the first conductive layer 111, the second conductive layer 112, and the lowermost conductive layer 115 are electrically connected to each other is formed.

The reason why the plating layer 118 is formed before the first surface dielectric layer 131 is formed (see FIG. 7) will be described hereinafter. This is because if the plating layer 118 is formed after the first surface dielectric layer 131 is formed (see FIG. 8), the plating layer 118 is also formed in a part of an underside surface 131*s* of the first surface dielectric layer 131 where the through hole 11*h* is formed, so that the conversion structure of the waveguide transmission line is not formed.

The laminated filter 11 will be described hereinafter.

For simplifying the explanation, in FIG. 9, the conductive layers and the dielectric layers are renumbered. In particular, the conductive layers and the dielectric layers are referred to as, from the uppermost layer, a conductive layer Cy 1, a dielectric layer Dy 9, a conductive layer Cy 2, a dielectric layer Dy 10, a conductive layer Cy 3, and a dielectric layer Dy 11. Further, below the dielectric layer Dy 11, they are referred to as, from the uppermost layer, a conductive layer Cy 4, a dielectric layer Dy 12, a conductive layer Cy 5, a dielectric layer Dy 13, a conductive layer Cy 6, a dielectric layer Dy 14, a conductive layer Cy 7, a dielectric layer Dy 15, and a conductive layer Cy 8.

As shown in FIGS. 1 and 9, the dielectric layers Dy 10, Dy 12 and Dy 14 (FIG. 9) have a periodic structure. This periodic structure has the feature of a filter. The laminated filter 11 of the high-frequency module 10 (FIG. 1) has the periodic structure and forms a filter by the periodic structure. That is, in the high-frequency module 10, a filter is formed by a part in which the dielectric layers and the conductive layers are alternately laminated (i.e., the laminated-structure part of the substrate).

Regarding the filter having such a periodic structure, it is common to provide an iris (a stub) and/or a resonance cavity (a cavity for resonance) at intervals of a quarter (¼) of a wavelength corresponding to a predetermined frequency. Therefore, in the laminated filter 11 according to the first example embodiment, the thickness th1 (FIG. 9 of the first dielectric layer 113 is adjusted to an integral multiple of a quarter (¼) of a wavelength corresponding to a predetermined frequency, and the thickness th2 (FIG. 9) of the dielectric layer 114 is adjusted to an integral multiple of a quarter (¼) of the wavelength corresponding to the predetermined frequency. Specifically, the thickness of each of the dielectric layers Dy 10, 11, 12, 13, 14 and 15 is adjusted to an integer multiple of a quarter (¼) of the wavelength corresponding to the predetermined frequency.

In this way, it is possible to effectively operate the laminated filter 11. As described above, the high-frequency module 10 according to the first example embodiment is characterized in that a periodic structure is formed by using a layer structure. The thickness of the dielectric layer depends on the number of layers and is, for example, in a range from about 0.05 mm (millimeters) to 0.5 mm (millimeters). Meanwhile, the frequency used by the high-frequency module 10 is, for example, millimeter waves or terahertz waves, and the length of a quarter (¼) of wavelengths corresponding to these frequencies is in a range from about 0.2 mm (millimeters) to 0.5 mm (millimeters). As can be understood from these facts, the high-frequency module 10 can be easily used in the frequency band of millimeter waves or terahertz waves.

The high-frequency module 10 according to the first example embodiment includes a filter having a periodic structure. In this way, the high-frequency module 10 can reduce the size of the filter. As a result, it is possible to provide a high-frequency module including a microstrip line 121*a* and a waveguide conversion structure, capable of reducing the size thereof.

Further, the laminated filter 11 included in the high-frequency module 10 is formed by a multilayer substrate. Therefore, the first example embodiment can be implemented by just adding a process for forming a laminated filter 11 in the existing manufacturing process for a multilayer substrate.

Further, in the case where desired characteristics cannot be obtained by the laminated filter 11 alone because the number of layers in the substrate is small, the laminated filter 11 can be used as an auxiliary filter for a waveguide filter or a planar-line filter (e.g., a filter using a microstrip line 121*a*).

By using the laminated filter 11 as an auxiliary filter, the number of stages of an external waveguide filter can be reduced and hence the outer size thereof can be reduced. Further, by using the laminated filter 11 as an auxiliary filter, it is possible to relax the processing accuracy of the waveguide filter.

Features of the high-frequency module 10 according to the first example embodiment will be described hereinafter. The high-frequency module 10 includes a microstrip-line to waveguide conversion structure using a multilayer substrate, and includes a dielectric of the multilayer substrate and a filter using a stub or the like having a periodic structure formed by a plurality of inner-layer patterns. In this way, it is possible to reduce the size of the high-frequency module 10, and to reduce the cost owing to the reduction in the size.

Second Example Embodiment

Figure 10:
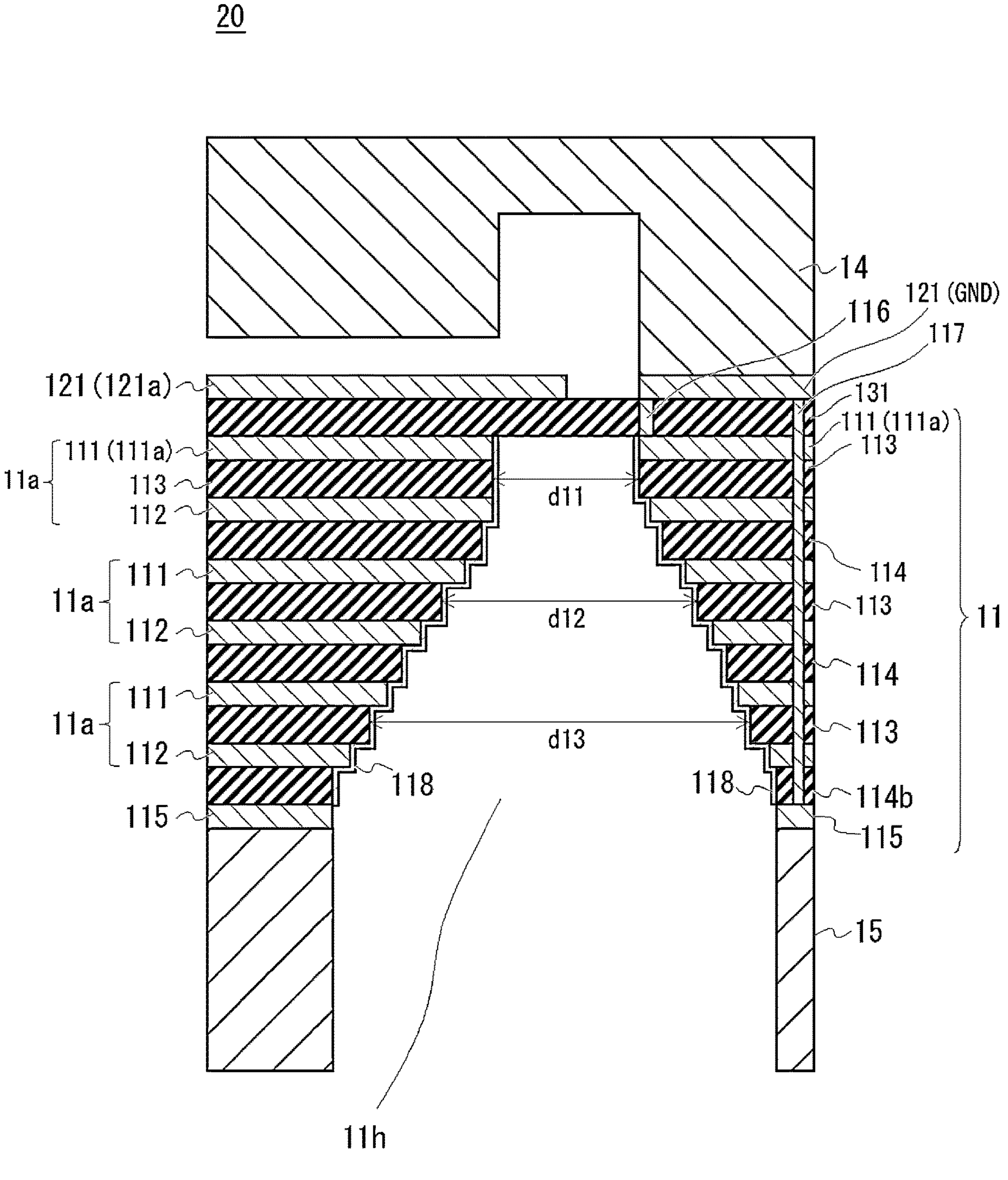
FIG. 10 is a cross-sectional view showing an example of a high-frequency module according to a second example embodiment.

FIG. 10 is a cross-sectional view showing an example of a high-frequency module according to a second example embodiment.

As shown in FIG. 10, in a high-frequency module 20 according to the second example embodiment, the first width d11 of the through hole in the first dielectric layer 113 becomes larger from the first dielectric layer 113 toward the lowermost conductive layer 115. Specifically, the width d13 of the through hole in the lowermost first dielectric layer 113 is greater than the width d12 of the through hole in an intermediate first dielectric layer 113, and the width d12 of the through hole in the intermediate first dielectric layer 113 is greater than the width d11 of the uppermost through hole first dielectric layer 113. In this way, the mouth of the through hole 11*h* (the waveguide) becomes larger than the mouth of the waveguide of the high-frequency module 10 according to the first example embodiment, so that the filter-structure part can be used as an antenna.

Third Example Embodiment

Figure 11:
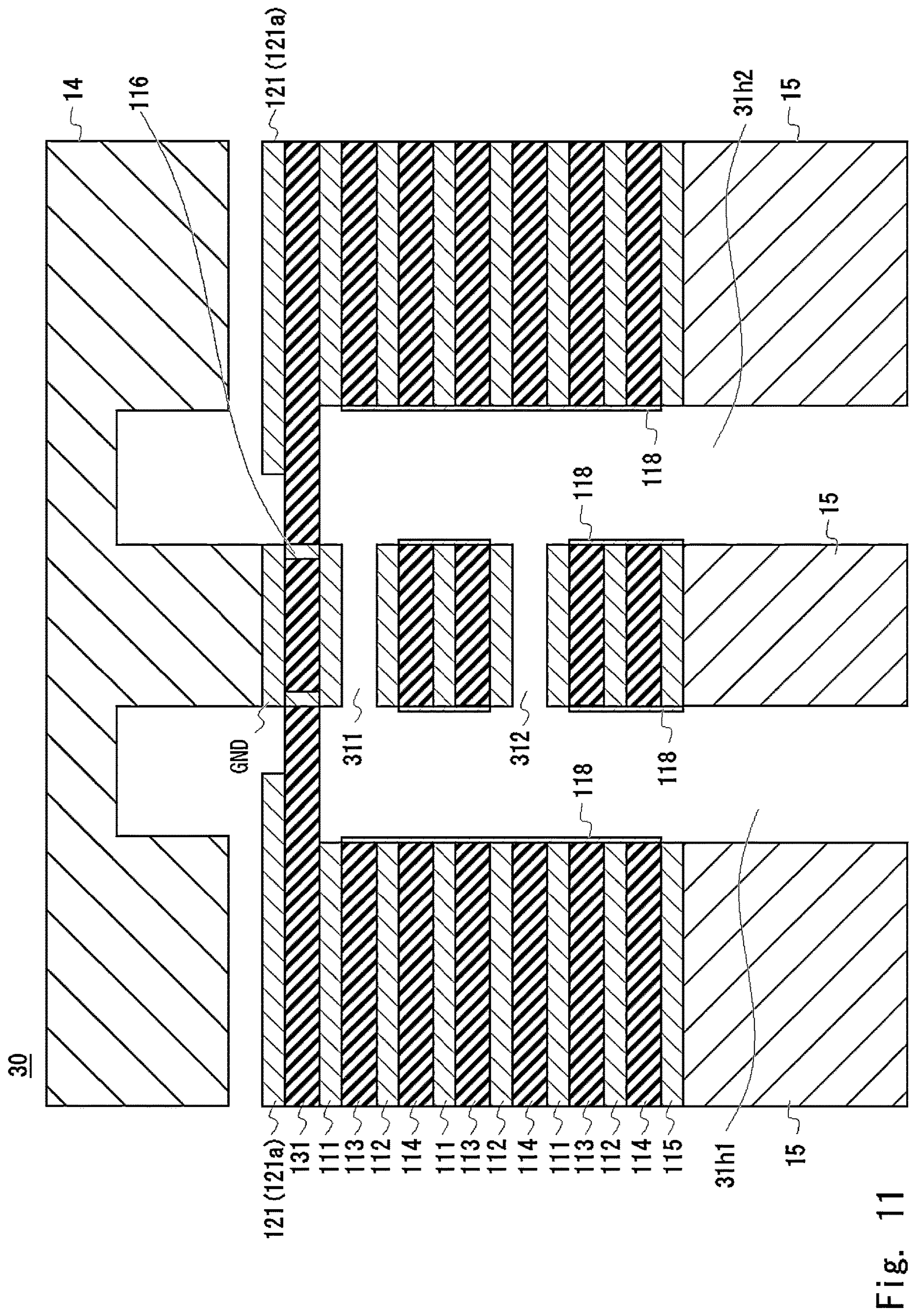
FIG. 11 is a cross-sectional view showing an example of a high-frequency module according to a third example embodiment.

FIG. 11 is a cross-sectional view showing an example of a high-frequency module according to a third example embodiment.

As shown in FIG. 11, a high-frequency module 30 according to the third example embodiment differs from the high-frequency module 10 (Refer to FIG. 1 or FIG. 2) according to the first example embodiment because two through holes (two waveguides), i.e., a first through hole 31*h*1 and a second through hole 31*h*2, are provided in the high-frequency module 30. Further, there is another difference that opening 311 and 312 for connecting the two waveguides are provided.

In the manufacturing process for the high-frequency module 30, the two waveguides (the first and second through holes 31*h*1 and 31*h*2) are formed in a manner similar to that for the manufacturing process for the high-frequency module 10. After the two waveguides are formed, the opening 311 is formed by removing a part of the first dielectric layer 113 and the opening 312 is formed by removing a part of the dielectric layer 114. Note that the openings 311 and 312 are formed so that they are arranged at an interval of a quarter (¼) of the wavelength corresponding to the predetermined frequency. As a result, since the openings 311 and 312 are arranged at the interval of a quarter (¼) of the wavelength corresponding to the predetermined frequency, the high-frequency module 30 operates as a directional coupler.

Note that it is possible to adjust the degree of the coupling of the directional coupler to a predetermined degree of coupling by changing the thicknesses of the first dielectric layer 113 and the dielectric layer 114 to respective predetermined thicknesses.

In the first to third example embodiments, a passive element such as a laminated filter or a directional coupler is formed by using a multilayer substrate based on the fact that the wavelengths of millimeter waves and terahertz waves are short. In this way, there is no need to provide an external filter or the like, so that the size of the high-frequency module can be reduced and the number of components can also be reduced. Consequently, it is possible to reduce the cost.

The present disclosure is not limited to the above-described examples embodiments, and they may be modified as appropriate without departing from the scope and spirit of the present disclosure.

Although the present invention is explained above with reference to example embodiments, the present invention is not limited to the above-described example embodiments. Various modifications that can be understood by those skilled in the art can be made to the configuration and details of the present invention within the scope of the invention.

This application is based upon and claims the benefit of priority from Japanese patent applications No. 2019-023468, filed on Feb. 13, 2019, the disclosure of which is incorporated herein in its entirety by reference.

REFERENCE SIGNS LIST

10 HIGH-FREQUENCY MODULE
11 LAMINATED FILTER
11*a* CORE MATERIAL
11*al* LAMINATED CORE MATERIAL
111, 111*a* FIRST CONDUCTIVE LAYER
112 SECOND CONDUCTIVE LAYER
113 FIRST DIELECTRIC LAYER
114, 114*b* DIELECTRIC LAYER
115 LOWERMOST CONDUCTIVE LAYER
116 FIRST THROUGH VIA
117 SECOND THROUGH VIA
118 PLATING LAYER
11*h* THROUGH HOLE
121 FIRST SURFACE CONDUCTIVE LAYER
121*a* MICROSTRIP LINE
131 FIRST SURFACE DIELECTRIC LAYER
131*s* UNDERSIDE SURFACE
14 SHORT-CIRCUITED LID
15 METAL BODY
31*h*1 FIRST THROUGH HOLE
31*h*2 SECOND THROUGH HOLE
311, 312 OPENING
D1 FIRST WIDTH
D11, D12, D13 WIDTH
D2 SECOND WIDTH
D3 THIRD WIDTH
th1, th2 THICKNESS
GND GROUND

What is claimed is:

1. A method for manufacturing a high-frequency module, comprising:

a step of forming, by removing a part of each of a plurality of core materials in which a first dielectric layer is provided between a first conductive layer and a second conductive layer, a through hole piercing therethrough from the first conductive layer to the second conductive layer, the through hole in the first dielectric layer having a first width;

a step of increasing a width of the through hole in the first conductive layer to a second width by removing a part of the first conductive layer;

a step of increasing the width of the through hole in the second conductive layer to the second width by removing a part of the second conductive layer;

a step of forming a laminated filter by alternately laminating, one layer at a time, a plurality of dielectric layers and the plurality of core materials above a lowermost conductive layer;

a step of forming the through hole having the second width in the plurality of dielectric layers by removing a part of the plurality of dielectric layers;

a step of forming the through hole having the second width in the lowermost conductive layer by removing a part of the lowermost conductive layer;

a step of forming a plating layer of a conductive material on a surface of the laminated filter on a side thereof bordering the through hole piercing therethrough;

a step of forming a first surface dielectric layer by laminating a dielectric above the laminated filter;

a step of forming a first surface conductive layer by laminating a conductor above the first surface dielectric layer and performing etching on the conductor the first surface conductive layer including a transmission line for a high-frequency signal and a ground;

a step of forming a first through via configured to electrically connect the ground to the uppermost first conductive layer; and a step of forming a second through via configured to electrically connect the ground, the first conductive layer, the second conductive layer, and the lowermost conductive layer to each other, wherein the first width of the through hole in the first dielectric layer is different from the second width of the through hole in any one of the plurality of dielectric layers, the first width and the second width are widths in a direction perpendicular to a direction of lamination, a thickness of the first dielectric layer is an integral multiple of a quarter (¼) of a wavelength corresponding to a predetermined frequency, and a thickness of each of the plurality of dielectric layers is an integral multiple of a quarter (¼) of the wavelength corresponding to the predetermined frequency.

2. A high-frequency module comprising:

a laminated filter in which a plurality of core materials and a plurality of dielectric layers are alternately laminated one layer at a time, and in which a through hole pierces lowermost conductive layer provided so as to be in contact with a lowermost dielectric layer, the plurality of core materials, and the plurality of dielectric layers, wherein each of the plurality of core materials includes a first conductive layer, a second conductive layer, and a first dielectric layer provided between the first conductive layer and the second conductive layer;

a first surface dielectric layer provided above the laminated filter; and a first surface conductive layer provided above the first surface dielectric layer, the first surface conductive layer including a transmission line for a high-frequency signal and a ground, wherein a first width of the through hole in the first dielectric layer is different from a second width of the through hole in any one of the plurality of dielectric layers, the first width and the second width are widths in a direction perpendicular to a direction of lamination, a thickness of the first dielectric layer is an integral multiple of a quarter (¼) of a wavelength corresponding to a predetermined frequency, and a thickness of each of the plurality of dielectric layers is an integral multiple of a quarter (¼) of the wavelength corresponding to the predetermined frequency.

3. The high-frequency module according to claim 2, further comprising:

a first through via configured to electrically connect the ground to an uppermost first conductive layer; and a second through via configured to electrically connect the ground, the first conductive layer, the second conductive layer, and the lowermost conductive layer to each other.

4. The high-frequency module according to claim 2, further comprising:

a lid provided so as to be in contact with the ground to short-circuit the lid to the ground; and a metal body provided so as to be in contact with the lowermost conductive layer, wherein the through hole pierces through the metal body.

5. The high-frequency module according to claim 2, further comprising a plating layer provided on a surface of the laminated filter on a side thereof bordering the through hole, the plating layer containing a conductive material.

6. The high-frequency module according to claim 5, wherein a thickness of the plating layer is of such a thickness that, when an electromagnetic wave having the predetermined frequency is transmitted through the through hole, a transmission loss thereof is equal to or smaller than a predetermined loss.

7. The high-frequency module according to claim 2, wherein the first width increases from the first dielectric layer toward the lowermost conductive layer.

8. A high-frequency module comprising:

a laminated filter in which: a plurality of core materials and a plurality of dielectric layers are alternately laminated one layer at a time; a first through hole pierces a lowermost conductive layer provided so as to be in contact with a lowermost dielectric layer, the plurality of core materials, and the plurality of dielectric layers; a second through hole pierces the lowermost conductive layer, the plurality of core materials, and the plurality of dielectric layers; and each of the plurality of core materials includes a first conductive layer, a second conductive layer, and a first dielectric layer provided between the first conductive layer and the second conductive layer;

a first surface dielectric layer provided above the laminated filter;

a first surface conductive layer provided above the first surface dielectric layer, the first surface conductive layer including a transmission line for a high-frequency signal and a ground; and a through via configured to electrically connect the ground to the uppermost first conductive layer, wherein in the laminated filter: a part of the first dielectric layer or the dielectric layer is removed, and the first and second through holes are connected to each other by a first opening; and another part of the first dielectric layer or the dielectric layer is removed, and the first and second through holes are connected to each other by a second opening, and a distance between the first and second openings is an integral multiple of a quarter (¼) of a wavelength corresponding to a predetermined frequency.

* * * * *